J. C. BEVELLE AND J. J. SMITH.
VALVE AND VALVE SEAT.
APPLICATION FILED JAN. 30, 1920.
1,391,450.          Patented Sept. 20, 1921.
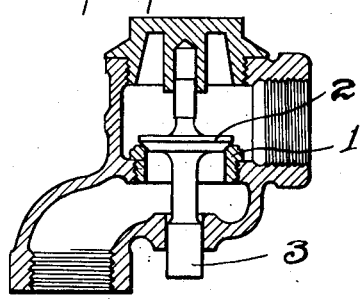
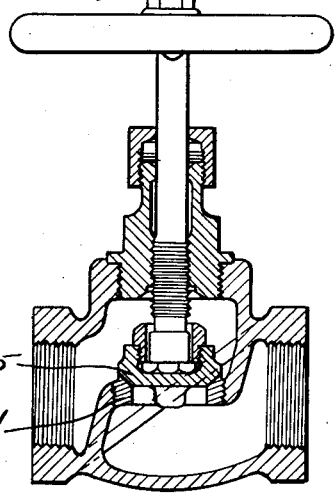
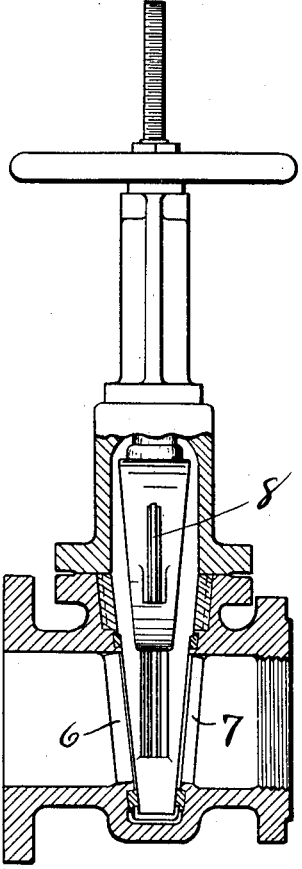
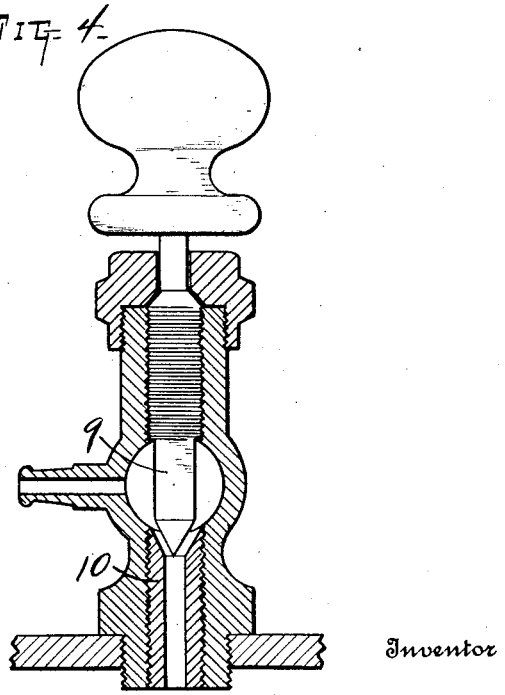
JOSEPH C. BEVELLE.
AND
JOSEPH J. SMITH.

UNITED STATES PATENT OFFICE.

JOSEPH C. BEVELLE AND JOSEPH J. SMITH, OF EL PASO, TEXAS.

VALVE AND VALVE-SEAT.

1,391,450.  Specification of Letters Patent.  Patented Sept. 20, 1921.

Application filed January 30, 1920. Serial No. 355,233.

*To all whom it may concern:*

Be it known that we, JOSEPH C. BEVELLE and JOSEPH J. SMITH, both citizens of the United States of America, residing at El Paso, in the county of El Paso and State of Texas, have invented certain new and useful Improvements in Valves and Valve-Seats, of which the following is a specification.

Our invention relates to valves and more particularly to valves which are rust proof and non-corrodible; and the object is to provide valves which will not be affected by water, alkali, acids, or other elements. It is well known that valves are short-lived when used where they come in contact with such elements as stated above. Valves made of cast steel or iron or case-hardened steel or iron will not long resist such elements. Valves made of brass and other soft metals will be pitted by scale which forms in pipe lines, sand and similar elements and for this reason the valves are short-lived. Valves made of such material often are dangerous to workmen, causing serious burns. Our object is to provide valves which will not be affected by such elements as are above named and which will last indefinitely and which will be less dangerous to workmen. Other objects and advantages will be fully explained in the following description and the invention will be more particularly pointed out in the claims.

Reference is had to the accompanying drawings which form a part of this application.

Figure 1 is a vertical section of a blow-off valve constructed in accordance with our invention. Fig. 2 is a vertical section of a globe valve. Fig. 3 is a vertical section of a gate valve. Fig. 4 is a vertical section of a gage valve.

Similar characters of reference are used to indicate the same parts throughout the several views.

Our valve seats and valve heads are made of a stainless metal or steel, the general analysis of which is as follows:

| | |
|---|---|
| Iron | 86.055 |
| Carbon | .30 |
| Silicon | .20 |
| Manganese | .40 |
| Sulfur | .020 |
| Phosphorus | .025 |
| Chrome | 13.00 |

The advantages of valves constructed of such materials are that they will not rust or corrode and will not be affected by acids and they will not be affected by sand or similar elements.

The valve shown in Fig. 1 has a removable seat 1 made of the improved material and the valve disk 2 is made of the same composition and the disk 2 will seal against the seat 1 and the part 3 will close the opening in the lower part of the valve casing. The valve shown in Fig. 2 has a removable seat 4 and the part 5 of the valve will seal against the seat 4. The parts 4 and 5 are made of the improved metal. The other parts making the complete valve are constructed and operate in the usual manner. In the gate valve shown in Fig. 3, the removable seats 6 and 7 are made of the improved material and the valve disk 8 is made of the improved material. In the gage valve shown in Fig. 4, the valve 9 and the removable seat 10 are made of the improved metal.

Valves made of the improved material have been used under actual service conditions and the practical use shows that such valves will serve several times or many times longer than any known valves. The valves made of such material are particularly desirable where the valves are not easily accessible for renewal, as in large reservoirs and irrigating dams. The valves have the requisite degree of hardness and the requisite resistance to attacks by alkali and acids, the valves being rust-proof and non-corrosive. It is apparent that this material may be used for making valves of various types and for making surfaces of other structures subject to a grinding or bearing action.

In practice, the blow-off valve shown in Fig. 1 is of great service in preventing burns. The valves heretofore used would operate all right when new. When an engine comes in off a run into a roundhouse, the engine is "blowed down," or the steam and water are let out of the boiler through the blow-off valve, a pipe being attached to the valve and the water carried through the pipe.

The valves heretofore in use would in a very short time be so eaten by the alkali that frequently the steam, instead of blowing out through the valve, would blow around the valve and stem and burn the men seriously. In such case our improved valves are perfectly safe and they last so long that such accidents do not occur, and even if partly worn away, the wear is so gradual that dangers may be avoided.

What we claim, is,—

1. A valve seat constructed of a composition substantially in the following proportions: 86.055 parts iron, .30 parts carbon, .20 parts silicon, .40 parts manganese, .020 parts sulfur, .025 parts phosphorus, and 13.00 parts chrome, properly mixed and formed into a homogeneous mass.

2. A valve and seat therefor, each constructed of a composition metal consisting of 86.055 parts iron, .30 parts carbon, .20 parts silicon, .40 parts manganese, .020 parts sulfur, .025 parts phosphorus, and 13.00 parts chrome properly mixed and formed into a homogeneous mass.

3. The herein described process of making metallic valves and seats which consists in mixing iron 86.005 parts, carbon .30 parts, silicon .20 parts, manganese .40 parts, sulfur .020 parts, phosphorus .025 parts, and chrome 13.00 parts, and forming the same into the respective shapes.

In testimony whereof, we set our hands, this 21 day of January, A. D., 1920.

JOSEPH C. BEVELLE.
JOSEPH J. SMITH.